(12) United States Patent
Eckhart et al.

(10) Patent No.: US 7,983,914 B2
(45) Date of Patent: Jul. 19, 2011

(54) METHOD AND SYSTEM FOR IMPROVED SPEECH RECOGNITION BY DEGRADING UTTERANCE PRONUNCIATIONS

(75) Inventors: John W. Eckhart, Boca Raton, FL (US); Harvey M. Ruback, Loxahatchee, FL (US)

(73) Assignee: Nuance Communications, Inc., Burlington, MA (US)

( * ) Notice: Subject to any disclaimer, the term of this patent is extended or adjusted under 35 U.S.C. 154(b) by 788 days.

(21) Appl. No.: 11/200,810

(22) Filed: Aug. 10, 2005

(65) Prior Publication Data

US 2007/0038454 A1 Feb. 15, 2007

(51) Int. Cl.
*G10L 15/04* (2006.01)

(52) U.S. Cl. ........ 704/254; 704/243; 704/244; 704/251; 704/260

(58) Field of Classification Search .......... 704/260, 704/254, 251, 243, 244
See application file for complete search history.

(56) References Cited

U.S. PATENT DOCUMENTS

| | | | | |
|---|---|---|---|---|
| 5,131,043 A * | 7/1992 | Fujii et al. | .......... | 704/254 |
| 5,579,436 A * | 11/1996 | Chou et al. | .......... | 704/244 |
| 5,659,771 A * | 8/1997 | Golding | .......... | 715/257 |
| 5,684,924 A * | 11/1997 | Stanley et al. | .......... | 704/233 |
| 5,737,723 A * | 4/1998 | Riley et al. | .......... | 704/243 |
| 5,748,840 A * | 5/1998 | La Rue | .......... | 704/254 |
| 5,864,805 A | 1/1999 | Chen et al. | | |
| 5,899,973 A | 5/1999 | Bandara et al. | | |
| 5,907,839 A * | 5/1999 | Roth | .......... | 1/1 |
| 5,950,160 A | 9/1999 | Rozak | | |
| 6,064,959 A * | 5/2000 | Young et al. | .......... | 704/251 |
| 6,073,099 A * | 6/2000 | Sabourin et al. | .......... | 704/256.6 |
| 6,185,530 B1 * | 2/2001 | Ittycheriah et al. | .......... | 704/255 |
| 6,195,634 B1 * | 2/2001 | Dudemaine et al. | .......... | 704/231 |
| 6,345,253 B1 | 2/2002 | Viswanathan | | |
| 6,385,579 B1 * | 5/2002 | Padmanabhan et al. | .......... | 704/243 |
| 6,418,410 B1 | 7/2002 | Nassiff et al. | | |
| 6,721,702 B2 * | 4/2004 | Schneider | .......... | 704/251 |
| 6,754,625 B2 * | 6/2004 | Olsen et al. | .......... | 704/235 |
| 6,912,498 B2 * | 6/2005 | Stevens et al. | .......... | 704/235 |
| 6,985,861 B2 * | 1/2006 | Van Thong et al. | .......... | 704/254 |
| 7,013,276 B2 * | 3/2006 | Bickley et al. | .......... | 704/255 |
| 7,216,079 B1 * | 5/2007 | Barnard et al. | .......... | 704/244 |
| 7,219,056 B2 * | 5/2007 | Axelrod et al. | .......... | 704/235 |

(Continued)

OTHER PUBLICATIONS

Golding, Andrew. 1995. "A Bayesian hybrid method for context-sensitive spelling correction". In Proceedings of the Third Workshop on Very Large Corpora, Cambridge, MA. ACL.*

(Continued)

*Primary Examiner* — Richemond Dorvil
*Assistant Examiner* — Greg Borsetti
(74) *Attorney, Agent, or Firm* — Wolf, Greenfield & Sacks, P.C.

(57) ABSTRACT

A speech recognition system or method can include a speech input device and a processor coupled to the speech input device. The processor can be programmed to identify a plurality of words that are members of confusable pairs of words where each pair includes a target word and a substituted word. The processor can degrade a pronunciation of the substituted word to provide a worse pronunciation of the substituted word. The processor can further compare the pronunciation of the target word with the worse pronunciation to the substituted word. The processor can be further programmed to reduce confusion between the substituted word and other words in a recognition grammar of the speech recognition engine and can also narrow the scope within which the substituted word is recognized.

9 Claims, 2 Drawing Sheets

U.S. PATENT DOCUMENTS

| | | | | |
|---|---|---|---|---|
| 7,257,565 | B2* | 8/2007 | Brill | 706/45 |
| 7,266,495 | B1* | 9/2007 | Beaufays et al. | 704/236 |
| 7,315,818 | B2* | 1/2008 | Stevens et al. | 704/235 |
| 2002/0049568 | A1* | 4/2002 | Erdogan et al. | 702/189 |
| 2002/0128840 | A1* | 9/2002 | Hinde et al. | 704/258 |
| 2002/0138265 | A1* | 9/2002 | Stevens et al. | 704/251 |
| 2002/0184016 | A1 | 12/2002 | Hartley et al. | |
| 2002/0184019 | A1 | 12/2002 | Hartley et al. | |
| 2003/0187649 | A1* | 10/2003 | Logan et al. | 704/260 |
| 2003/0216918 | A1* | 11/2003 | Toyama et al. | 704/254 |
| 2003/0216919 | A1* | 11/2003 | Roushar | 704/260 |
| 2004/0111253 | A1* | 6/2004 | Luo et al. | 704/4 |
| 2005/0114131 | A1* | 5/2005 | Stoimenov et al. | 704/251 |
| 2005/0203751 | A1* | 9/2005 | Stevens et al. | 704/276 |
| 2006/0116877 | A1* | 6/2006 | Pickering et al. | 704/231 |
| 2006/0143008 | A1* | 6/2006 | Schneider et al. | 704/251 |
| 2006/0184365 | A1* | 8/2006 | Odell et al. | 704/235 |

OTHER PUBLICATIONS

L. Mangu. E. Brill, and A. Stolcke. "Finding consensus in speech recognition: word error minimization and other applications of confusion networks," Computer speech and Language, vol. 14, No. 4, 2000.*

Strik, H., Cucchiarini, C., 1998. Modeling pronunciation variation for ASR: overview and comparison of methods. In: Strik, H., Kessens, J.M., Wester, M. (Eds.), Proceedings of the ESCA Workshop on Modeling Pronunciation Variation for Automatic Speech Recognition, Rolduc, Kerkrade, May 4-6, 1998. A2RT, University of Nijmegen, pp. 137-144.*

Sloboda, T., Weibel, A., 1996. Dictionary learning for spontaneous speech recognition. In: Proceedings of ICSLP-96, Philadelphia, pp. 2328-2331.*

J. Tian, I. HWinen, and 0. Viikki, "Multilingual Pronunciation Modeling for Improving Multilingual Speech Recognition," In Proceedings of Ih International Conference on Spoken Language Processing, Denver, USA, pp. 497-500, 2002.*

Holter, T., Svendsen, T., 1998. Maximum likelihood modelling of pronunciation variation. In: Strik, H., Kessens, J.M., Wester, M. (Eds.), Proceedings of the ESCA Workshop on Modeling Pronunciation Variation for Automatic Speech Recognition, Rolduc, Kerkrade, May 4-6, 1998. A2RT, University of Nijmegen, pp. 63-66.*

Eric Fosler-Lussier, Dynamic Pronunciation Models for Automatic Speech Recognition, Ph.D. thesis, University of California, Berkeley, 1999.*

Fosler-Lussier et al. "A framework for predicting speech recognition errors" Mar. 2005.*

* cited by examiner

METHOD AND SYSTEM FOR IMPROVED SPEECH RECOGNITION BY DEGRADING UTTERANCE PRONUNCIATIONS

BACKGROUND OF THE INVENTION

1. Technical Field

This invention relates to the field of speech recognition and more particularly to a method and system for improving overall speech recognition by intentionally degrading utterance pronunciations.

2. Description of the Related Art

Recognition accuracy of a speech recognition system can be lowered by various factors. One possible recognition failure can be do to substitution, where an incorrect word is substituted for the word that was expected. For example, if the user says "Dial" but the system recognizes "Call" then the word "call" was substituted for "dial". Often times, a certain substitution is prevalent for a particular speech recognition grammar. For example, if the dial to call substitution occurs frequently during operation it would be a known confusable pair. Using statistically significant data sets, accuracy testing can be performed to identify weaknesses in a particular grammar set. From the resulting information, it is possible to identify possible confusable pairs. Past methods to improve these confusable pairs centered on improving the pronunciations for the expected word to try and match a wider spectrum and give the system more choices.

SUMMARY OF THE INVENTION

Embodiments in accordance with the invention can include a new method and system that intentionally degrades the pronunciation of a substituted word to provide an overall improved system recognition performance.

In a first embodiment in accordance with the invention, a method for improving overall system recognition performance in a speech recognition engine can include the steps of identifying a plurality of words that are members of confusable pairs of words, each pair having a target word and a substituted word, and degrading a pronunciation of the substituted word to provide a worse pronunciation of the substituted word. The method can further include the step of comparing the pronunciation of the target word with the worse pronunciation to the substituted word. The step of degrading the pronunciation can include providing a slightly worse pronunciation to the substituted word. The method can further include the step of causing the substituted word to be less favorable overall. The method can further include the step of narrowing the scope within which the substituted word is recognized. Thus, the method can reduce confusion between the substituted word and words in a recognition grammar other than the target word.

In a second embodiment in accordance with the invention, a speech recognition system can include a speech input device such as a microphone, and a processor coupled to the speech input. The processor can be programmed to identify a plurality of words that are members of confusable pairs of words, each pair comprising of a target word and a substituted word and degrade a pronunciation of the substituted word to provide a worse pronunciation of the substituted word. The processor can be further programmed to compare the pronunciation of the target word with the worse pronunciation to the substituted word and further degrade the pronunciation by providing a slightly worse pronunciation to the substituted word. The processor can be further programmed to cause the substituted word to be less favorable overall. The processor can be further programmed to reduce confusion between the substituted word and other words in a recognition grammar of the speech recognition engine and can also narrow the scope within which the substituted word is recognized. The processor can also reduce confusion between the substituted word and words in a recognition grammar other than the target word.

In other aspects of the invention, a computer program having a plurality of code sections executable by a machine for causing the machine to perform certain steps is described. The steps can generally include the steps outlined in the first and second embodiments described above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Embodiments in accordance with the invention can provide a system and method for improving overall system recognition performance by intentionally degrading a substituted word's pronunciation as opposed to trying to improve accuracy by adding or tuning pronunciations for an expected word. The embodiments herein try to reduce the confusability of two words by modifying the easily recognized word to narrow the scope within which it is recognized. In this manner the easily recognized work is not as easily confused with other words. Since this modified word's pronunciation is more easily recognized, this word accuracy is minimally affected.

Figure 1:
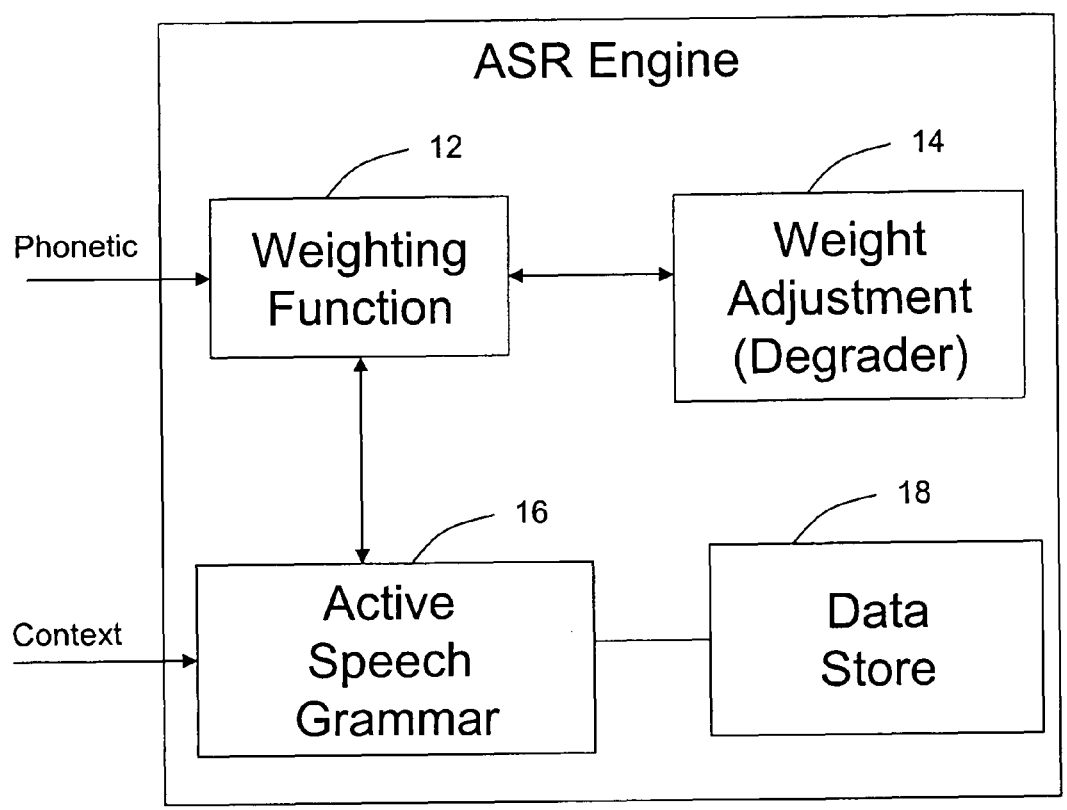
FIG. 1 is a speech recognition system in accordance with an embodiment of the present invention. .

Referring to FIG. 1, a substitution occurs when a speech recognition engine 10 believes that an unexpected word is a closer match to what was said than the expected result. Often times in a grammar, a few words will stick out as "strong" words. These words are very rarely misrecognized, and are frequently returned as confusions for other words. The side effects of adding pronunciations for the expected words in these confusions can result in additional confusions and an overall reduction in accuracy. It also increases footprint requirements for that grammar (although often the increase is negligible). Instead of trying to find additional pronunciations for the expected words, a system and method herein tries to provide a marginally worse pronunciation for the substituted word. A worse pronunciation causes the substituted word to be less favorable overall and thus minimizes the confusion with other words. The worse pronunciation can have a slightly negative affect on the accuracy of this word which can be minimized during an alternate pronunciation selection process. The technique provides a trade-off between a minor impact on the confusable word with a large increase in accuracy for the target word. The method for the degraded pronunciation will typically be, but is not necessarily limited to, the worst pronunciation. Typically a tool can identify and try this first; however, the fact can be that the words "best" pronunciation or some other pronunciation is the one that is the contributing cause of the confusion. (i.e., Sometimes the best pronunciation for a word also forces that word to be more similar to other words, and thus more confusable). Also, it may be possible to remove a certain pronunciation for a word (assuming that it contains multiple pronunciations) in order to reduce it's likelihood/strength/or confusability). All of these describe possible methods that lead to the word being less favorable overall.

Thus, a user providing a phonetic input of "DIAL" as an input or target word to the speech recognition engine 10 can be compared with a substituted word "CALL" from an active speech grammar 16 which can be a subset or retrieved from a data store 18. A weighting or comparison function 12 can be adjusted using a weight adjustment processor or degrader 14 that can degrade the pronunciation or "lower" the weight of the substituted word "CALL". Overall, as explained above, although a minor impact on the substituted or confusable word is incurred in this instance, the overall system accuracy for the target word will increase noticeably. Note, although the embodiment illustrated in FIG. 1 includes components in a single integrated speech recognition engine, embodiments herein are not limited to such integrated structure such that components of the speech engine can be disbursed in any number of arrangements among various elements of a communication system or other system utilizing a speech recognition engine.

For words that are typically very strong, the degraded pronunciation might not affect it's own accuracy much, and has the potential to increase the accuracy significantly for other words. This pattern of confusable words where you have "uni-directional" confusability could be implemented in a test analysis tool and provide guidance to application developers on how to repair this problem using this technique. Although the main embodiments herein were originally designed to reduce single confusable pairs, it also has the potential for increasing the accuracy of multiple words from a single step. For example, often times there is a word that almost always recognizes correctly, to the extent that it is often the substitution for multiple words in the grammar. By degrading the pronunciation for this word, you can potentially benefit more than one word.

Figure 2:
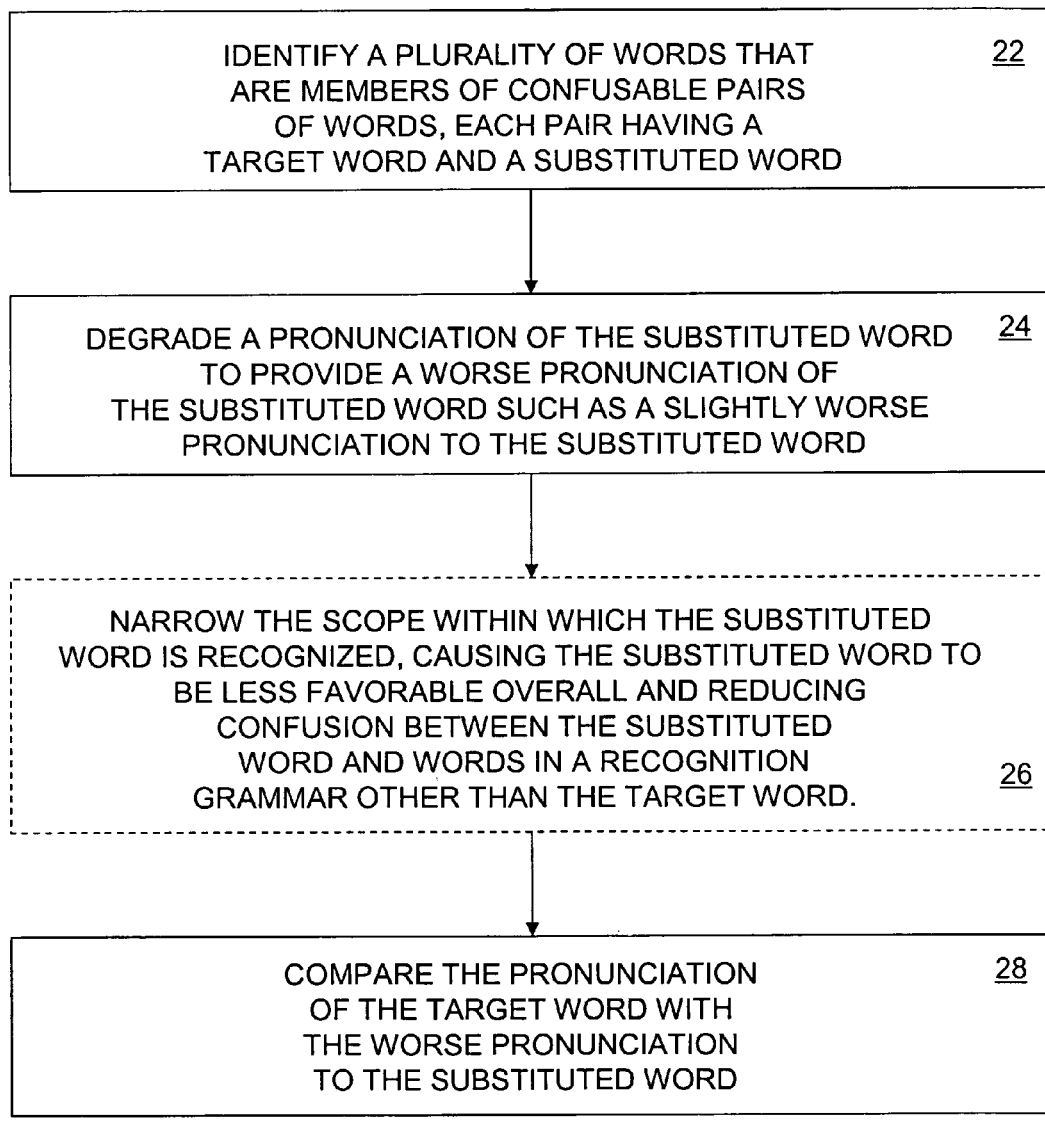
FIG. 2 is a flow chart illustrating a method for improving overall system recognition performance in a speech recognition engine in accordance with an embodiment of the present invention.

Referring to FIG. 2, a method 20 for improving overall system recognition performance in a speech recognition engine can include the step 22 of identifying a plurality of words that are members of confusable pairs of words, each pair having a target word and a substituted word, and degrading a pronunciation of the substituted word to provide a worse pronunciation of the substituted word at step 24. The method further include the step 28 of comparing the pronunciation of the target word with the worse pronunciation to the substituted word. The step of degrading the pronunciation can include providing a slightly worse pronunciation to the substituted word. The method can further optionally include the step 26 of causing the substituted word to be less favorable overall by narrowing the scope within which the substituted word is recognized. Thus, the method can reduce confusion between the substituted word and words in a recognition grammar other than the target word.

Embodiments in accordance with the invention can be a feature of a tool set that would attempt to recognize alternate pronunciations for strong words to improve the accuracy of weaker words. By running a speech recognition engine, it would be evident if this feature was implemented. In other words, a phonetician can know if the tool picked a lesser pronunciation.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. In a speech recognition engine executing on a computer, a method of improving overall system recognition performance comprising steps of:
   identifying a confusable pair of words, comprising a target word and a substitute word, in a candidate set of incorrectly recognized words by:
   (a) identifying a first word as being a word that is rarely misrecognized and is frequently returned as confusions for other words;
   (b) identifying a second word as being a word for which the first word is frequently substituted;
   (c) determining the first word to be the substitute word in the confusable pair; and
   (d) determining the second word to be the target word in the confusable pair; and
   adjusting a pronunciation of the substitute word to a worse pronunciation of the substitute word, wherein the adjusted pronunciation of the substitute word results in less accurate detection of the substitute word by the speech recognition engine.

2. The method of claim 1, wherein the method reduces confusion between the substituted word and other words in a recognition grammar of the speech recognition engine.

3. The method of claim 1, wherein the method further comprises the step of reducing confusion between the substituted word and words in a recognition grammar other than the target word.

4. A speech recognition computer-implemented system, comprising:
   a speech input device;
   a processor coupled to the speech input device, wherein the processor is programmed to:
   identify a confusable pair of words, comprising a target word and a substitute word, in a candidate set of incorrectly recognized words by:
   (a) identifying a first word as being a word that is rarely misrecognized and is frequently returned as confusions for other words;
   (b) identifying a second word as being a word for which the first word is frequently substituted;
   (c) determining the first word to be the substitute word in the confusable pair; and (d) determining the second word to be the target word in the confusable pair; and adjust a pronunciation of the substitute word to a worse pronunciation of the substitute word, wherein the adjusted pronunciation of the substitute word results in less accurate detection of the substitute word by the speech recognition engine.

5. The speech recognition system of claim 4, wherein the processor is further programmed to reduce confusion between the substituted word and other words in a recognition grammar of the speech recognition engine.

6. The speech recognition system of claim 4, wherein the processor is further programmed to reduce confusion between the substituted word and words in a recognition grammar other than the target word.

7. A non-transitory machine-readable storage, having stored thereon a computer program having a plurality of code sections executable by a machine for causing the machine to perform the steps of:

identifying a confusable pair of words, comprising a target word and a substitute word, in a candidate set of incorrectly recognized words by:

(a) identifying a first word as being a word that is rarely misrecognized and is frequently returned as confusions for other words;
(b) identifying a second word as being a word for which the first word is frequently substituted;
(c) determining the first word to be the substitute word in the confusable pair; and
(d) determining the second word to be the target word in the confusable pair; and adjusting a pronunciation of the substitute word to a worse pronunciation of the substitute word, wherein the adjusted pronunciation of the substitute word results in less accurate detection of the substitute word by the speech recognition engine.

8. The non-transitory machine readable storage of claim 7, wherein the computer program degrades the pronunciation by providing a worse pronunciation to the substituted word.

9. The non-transitory machine readable storage of claim 7, wherein the computer program further comprises a plurality of code sections for reducing confusion between the substituted word and words in a recognition grammar other than the target word.

* * * * *